United States Patent
Takehana et al.

(10) Patent No.: US 12,290,977 B2
(45) Date of Patent: May 6, 2025

(54) MOLDING UNIT FOR COOLING RESIN MOLDED ARTICLE, BLOW MOLDING DEVICE, INJECTION MOLDING DEVICE, AND METHOD

(71) Applicant: NISSEI ASB MACHINE CO., LTD., Nagano (JP)

(72) Inventors: Daizaburo Takehana, Nagano (JP); Toshiteru Oike, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 628 days.

(21) Appl. No.: 17/633,009

(22) PCT Filed: Aug. 6, 2020

(86) PCT No.: PCT/JP2020/030227
§ 371 (c)(1),
(2) Date: May 19, 2022

(87) PCT Pub. No.: WO2021/025127
PCT Pub. Date: Feb. 11, 2021

(65) Prior Publication Data
US 2023/0226744 A1 Jul. 20, 2023

(30) Foreign Application Priority Data

Aug. 8, 2019 (JP) .................................. 2019-145933
Aug. 8, 2019 (JP) .................................. 2019-146195

(51) Int. Cl.
*B29C 49/64* (2006.01)
*B29C 49/06* (2006.01)

(52) U.S. Cl.
CPC ............ *B29C 49/643* (2022.05); *B29C 49/06* (2013.01)

(58) Field of Classification Search
CPC .......................... B29C 49/643; B29C 49/6463
See application file for complete search history.

(56) References Cited

U.S. PATENT DOCUMENTS

| 4,592,719 A | 6/1986 | Bellehache et al. |
| 6,461,556 B2 | 10/2002 | Neter |

(Continued)

FOREIGN PATENT DOCUMENTS

| CN | 1294546 A | 5/2001 |
| JP | 54-50061 U1 | 4/1979 |

(Continued)

OTHER PUBLICATIONS

Mechanical translation of Yatsugi et al JP 2009154888 A dated Jul. 2009. (Year: 2009).*

(Continued)

*Primary Examiner* — Robert B Davis
(74) *Attorney, Agent, or Firm* — GREENBLUM & BERNSTEIN, P.L.C.

(57) ABSTRACT

There is provided a cooling mold unit for cooling a preform that has been injection-molded, the preform having a bottomed shape and made of a resin, the cooling mold unit including a core mold having an outer shape corresponding to an inner shape of the preform, and being insertable into the preform, in which an exhaust port configured to discharge air from an inside of the preform through an inside of the core mold is provided at a tip end portion of the core mold facing a bottom portion of the preform.

8 Claims, 13 Drawing Sheets

(56) References Cited

U.S. PATENT DOCUMENTS

| | | | |
|---|---|---|---|
| 10,144,168 | B2 | 12/2018 | Nakahara |
| 2001/0005063 | A1 | 6/2001 | Neter |
| 2003/0108695 | A1* | 6/2003 | Freek ..................... B29C 45/73 |
| | | | 264/528 |
| 2011/0042855 | A1* | 2/2011 | Puest ................. B29C 45/7207 |
| | | | 425/117 |
| 2019/0337218 | A1 | 11/2019 | Kawamura et al. |

FOREIGN PATENT DOCUMENTS

| | | | |
|---|---|---|---|
| JP | 59-118518 U1 | | 8/1984 |
| JP | 60-212324 A | | 10/1985 |
| JP | 4-49023 A | | 2/1992 |
| JP | 2002-509817 A | | 4/2002 |
| JP | 2009154888 A | * | 7/2009 |
| JP | 6230173 B2 | | 11/2017 |
| WO | 1999/50039 A1 | | 10/1999 |
| WO | 2019/078358 A1 | | 4/2019 |

OTHER PUBLICATIONS

International Search Report and Written Opinion of the International Searching Authority issued in International Patent Application No. PCT/JP2020/030227, dated Nov. 2, 2020, along with an English translation thereof.

Official Action issued Apr. 29, 2023 in Chinese family member application No. 2020800562708 and English translation thereof.

\* cited by examiner

MOLDING UNIT FOR COOLING RESIN MOLDED ARTICLE, BLOW MOLDING DEVICE, INJECTION MOLDING DEVICE, AND METHOD

BACKGROUND OF THE INVENTION

Field of the Invention

The present invention relates to a cooling mold unit for a resin molded article, a blow molding apparatus, an injection molding apparatus, and a method.

Description of the Related Art

A hot parison type blow molding apparatus has been conventionally known as one of apparatuses for manufacturing a resin container. The hot parison type blow molding apparatus is configured to blow-mold a resin container using residual heat generated in injection molding of a preform, and is advantageous in that it is possible to manufacture resin containers with varieties and excellence in aesthetic appearance as compared with a cold parison type.

For example, various proposals have been made regarding a hot parison type blow molding cycle and an injection molding cycle of a preform for the purpose of shortening the molding cycle. In order to shorten these molding cycles, it has been proposed to shorten an injection molding time of the preform in a rate-determining stage (cooling time of the preform in an injection mold), and to additionally cool the preform having high heat in a downstream step after the injection molding (see, for example, JP 6505344 B1).

There has also been proposed a configuration in which a preform is brought into contact with a cavity mold and a core mold to cool the preform through heat exchange with the molds, and the uneven temperature of the preform is adjusted (see, for example, JP 6230173 B2).

In additionally cooling the preform in a high temperature state by bringing the preform into contact with the core mold, it is necessary to bring the preform and the mold into contact with each other uniformly. For example, in a case where air remains in the preform when the core mold is inserted into the preform to be cooled, contact between the inner circumferential surface of the preform and the core mold is hindered, and it becomes difficult to appropriately cool the preform and adjust the temperature.

SUMMARY OF THE INVENTION

One aspect of the present invention is a cooling mold unit for cooling a preform that has been injection-molded, the preform having a bottomed shape and made of a resin, the cooling mold unit including a core mold having an outer shape corresponding to an inner shape of the preform, and being insertable into the preform, in which an exhaust port configured to discharge air from an inside of the preform through an inside of the core mold is provided at a tip end portion of the core mold facing a bottom portion of the preform.

Another aspect of the present invention is a cooling mold unit for cooling a preform that has been injection-molded, the preform having a bottomed shape and made of a resin, the cooling mold unit including a core mold having an outer shape corresponding to an inner shape of the preform, and being insertable into the preform, in which an exhaust groove extending from a tip end side to a base end side of an insertion part of the preform is provided on a surface facing an inner surface of the preform, in the core mold.

Further features of the present invention will become apparent from the following description of exemplary embodiments with reference to the attached drawings.

DESCRIPTION OF THE EMBODIMENTS

Figure 1:
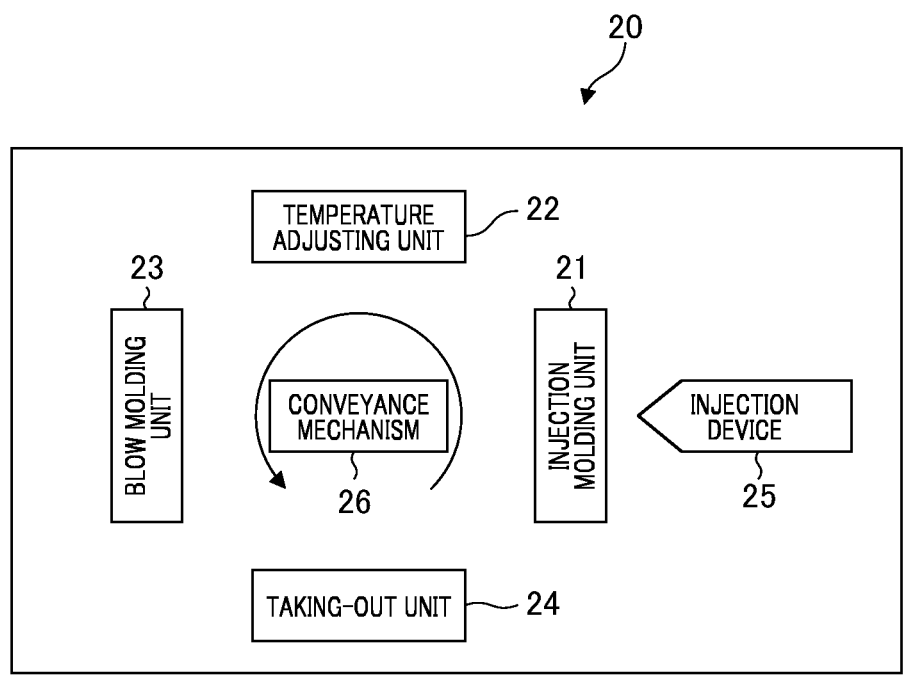
FIG. 1 is a diagram schematically illustrating a configuration of a blow molding apparatus in a first embodiment.

Hereinafter, embodiments of the present invention will be described with reference to the drawings.

In the embodiments, in order to facilitate understanding, structures and elements other than the main parts of the present invention will be described in a simplified or omitted manner. In addition, in the drawings, the same elements are denoted by the same reference numerals. Note that the shapes, dimensions, and the like of the respective elements illustrated in the drawings are schematically illustrated, and do not indicate actual shapes, dimensions, or the like.

First Embodiment

FIG. 1 is a diagram schematically illustrating a configuration of a blow molding apparatus 20 in a first embodiment. The blow molding apparatus 20 in the present embodiment is a hot parison type (also referred to as a single-stage type) apparatus that performs blow molding on a container by utilizing residual heat (internal heat quantity) from injection molding without cooling a preform 11 to room temperature.

The blow molding apparatus 20 includes an injection molding unit 21, a temperature adjusting unit 22, a blow molding unit 23, a taking-out unit 24, and a conveyance mechanism 26. The injection molding unit 21, the temperature adjusting unit 22, the blow molding unit 23, and the taking-out unit 24 are respectively disposed at positions rotated by a predetermined angle (for example, 90 degrees) around the conveyance mechanism 26.

(Conveyance Mechanism 26)

The conveyance mechanism 26 includes a rotating plate (not illustrated) that rotates about an axis in a direction perpendicular to the sheet surface of FIG. 1. On the rotating plate, one or more neck molds 27 (not illustrated in FIG. 1) for holding a neck portion 12 of the preform 11 or a resin container (hereinafter, simply referred to as a container) are arranged at every predetermined angle. The conveyance mechanism 26 rotates the rotating plate to convey the preform 11 (or the container) having the neck portion 12 held by the neck mold 27 to the injection molding unit 21, the temperature adjusting unit 22, the blow molding unit 23, and the taking-out unit 24 in this order. Note that the conveyance mechanism 26 can also raise and lower the rotating plate, and also performs operations related to mold closing and mold opening (mold releasing) for the preform in the injection molding unit 21.

(Injection Molding Unit 21)

Figure 2:
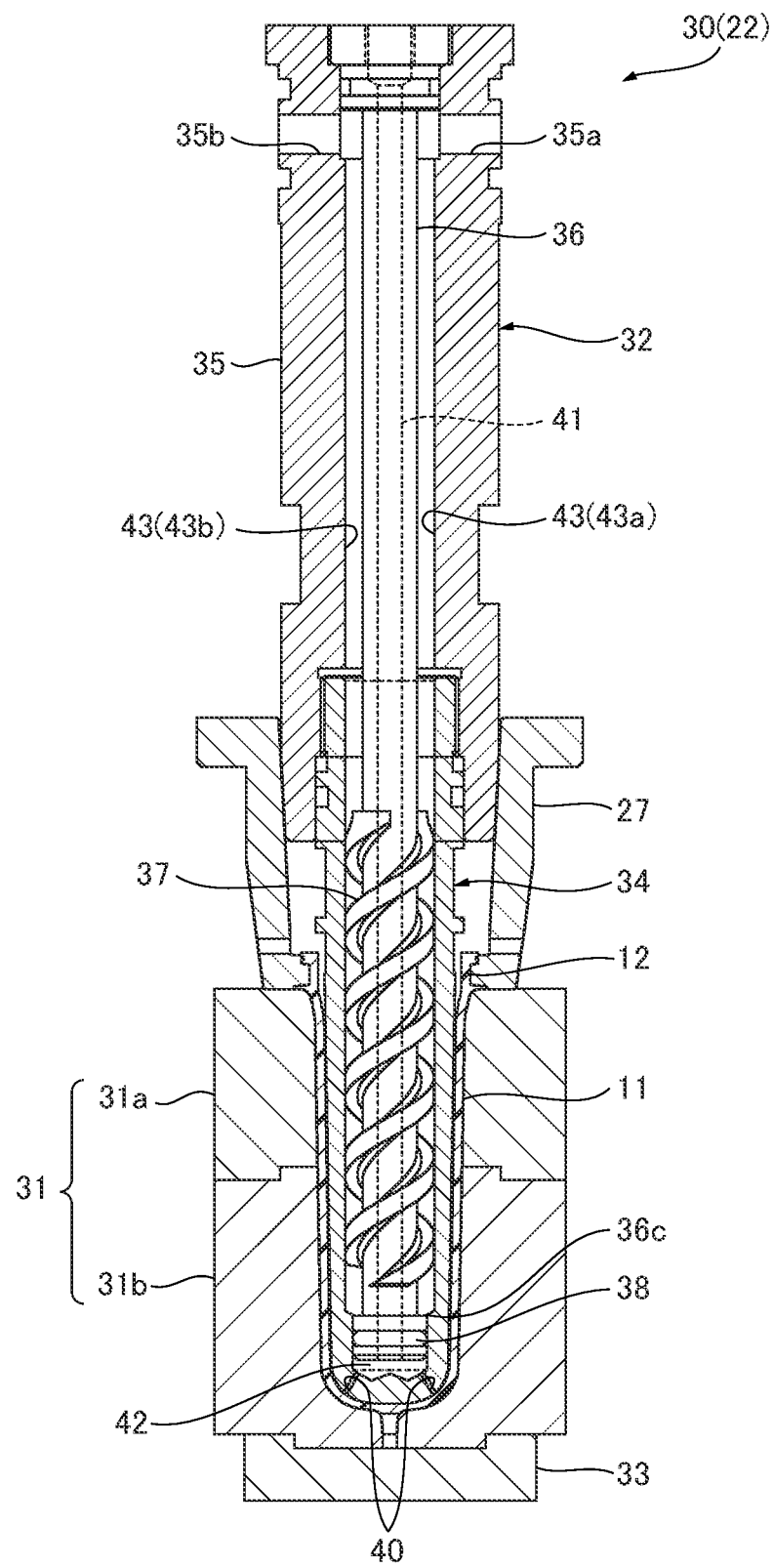
FIG. 2 is a view illustrating a configuration example of a temperature adjusting unit.

The injection molding unit 21 includes an injection cavity mold and an injection core mold, each of which is not illustrated, and manufactures the preform 11 illustrated in FIG. 2. An injection device 25 that supplies a resin material, which is a raw material of the preform 11, is connected with the injection molding unit 21.

In the injection molding unit 21, the injection cavity mold, the injection core mold, and the neck mold 27 of the conveyance mechanism 26, which have been described above, are closed to form a preform-shaped mold space. Then, the resin material is poured from the injection device 25 into such a preform-shaped mold space, and thus the preform 11 is manufactured by the injection molding unit 21.

Here, the entire shape of the preform 11 is a bottomed cylindrical shape in which one end side is opened and the other end side is closed. The neck portion 12 is formed at an end of the preform 11 on the opened side.

Further, the materials of the container and the preform 11 include a thermoplastic synthetic resin, and can be appropriately selected according to the use of the container. Specific examples of the materials include PET (polyethylene terephthalate), PEN (polyethylene naphthalate), PCTA (polycyclohexanedimethylene terephthalate), Tritan (Tritan (registered trademark): copolyester manufactured by Eastman Chemical Co., Ltd.), PP (polypropylene), PE (polyethylene), PC (polycarbonate), PES (polyethersulfone), PPSU (polyphenylsulfone), PS (polystyrene), COP/COC (cyclic olefin-based polymer), PMMA (polymethyl methacrylate: acrylic), PLA (polylactic acid), and the like.

Note that even when the injection molding unit 21 is opened, the neck mold 27 of the conveyance mechanism 26 is not released, and the preform 11 is held and conveyed as it is. The number of the preforms 11 simultaneously molded by the injection molding unit 21 (that is, the number of containers that can be simultaneously molded by the blow molding apparatus 20) can be appropriately set.

(Temperature Adjusting Unit 22)

The temperature adjusting unit 22 equalizes the temperatures or removes the uneven temperature in the preform 11 manufactured by the injection molding unit 21 to adjust the temperature of the preform 11 to a temperature suitable for blow molding (for example, about 90° C. to 105° C.). The temperature adjusting unit 22 also has a function of cooling the preform 11 in a high temperature state after the injection molding.

As illustrated in FIG. 2, the temperature adjusting unit 22 includes a mold unit 30 for temperature adjustment. The mold unit 30 is an example of a cooling mold unit, and includes a cavity mold (temperature adjusting pot) 31 capable of accommodating the preform 11, and a core mold 32.

The cavity mold 31 is a mold including a space for temperature adjustment having substantially the same shape as the outer shape of the preform 11 that has been manufactured by the injection molding unit 21, and is disposed on a support base 33. The cavity mold 31 in the present embodiment includes an upper mold 31a and a lower mold 31b, which are divided into upper and lower two stages.

A flow path (not illustrated) through which a temperature adjustment medium (cooling medium) flows is formed inside each of the upper mold 31a and the lower mold 31b. Therefore, the temperature of the cavity mold 31 is maintained at a predetermined temperature by the temperature adjustment medium flowing inside the upper mold 31a and the lower mold 31b. By changing the temperature of the temperature adjustment medium in the upper mold 31a and in the lower mold 31b, the temperature distribution of the preform 11 may be changed in the longitudinal direction of the preform 11.

Note that the temperature of the temperature adjustment medium of the cavity mold 31 is not particularly limited, but can be appropriately selected within a range of, for example, 5° C. to 80° C., preferably 30° C. to 60° C.

Here, the configuration of the cavity mold 31 is not limited to the configuration in the present embodiment. For example, the cavity mold 31 may be configured to be vertically divided into three stages. Furthermore, for example, the cavity mold 31 may include a pair of split molds split in the longitudinal direction of the preform 11.

The core mold 32 is a mold to be inserted into the preform 11, and is disposed to be movable forward and backward with respect to the neck mold 27 that holds the preform 11 by the temperature adjusting unit 22. FIG. 2 illustrates a state in which the core mold 32 extends downward in the drawing and is inserted into the neck mold 27.

The core mold 32 includes at least a core pin (first core mold) 34, a main body portion (second core mold) 35, and a cooling pipe 36.

The core pin 34 is a bottomed cylindrical, bar-shaped member to be inserted into the preform 11, and has an outer shape substantially the same as the inner shape of the preform 11. In addition, a cylindrical inner space for the temperature adjustment medium to flow through is formed inside the core pin 34 along the axial direction.

An exhaust port 40 communicating with the inner space of the core pin 34 is formed at a tip end of the core pin 34 facing the bottom surface of the preform 11. The exhaust port 40 of the core pin 34 has a function of discharging the air in the preform 11 into the core pin 34, when the core mold 32 is inserted into the preform 11, and improving the contact property between the core mold 32 and the preform 11.

Figure 4A:
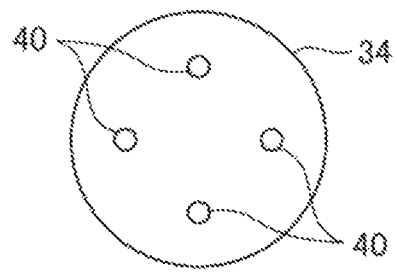
FIG. 4A is a bottom view of a core mold.

The exhaust port 40 is formed in a shape to be rotationally symmetric in the circumferential direction of the core mold 32 (more specifically, the core pin 34) with respect to the central axis of the core mold 32 (more specifically, the core pin 34). In a case where the exhaust port 40 is formed to be rotationally symmetric in the circumferential direction of the core mold 32 (more specifically, the core pin 34), the air in the preform 11 is easily discharged uniformly without unevenness in the circumferential direction. Thus, uneven contact between the core mold 32 and the preform 11 is less likely to occur. For example, in FIG. 4A, four exhaust ports 40 are formed at the tip end of the core pin 34 at intervals in the circumferential direction to be point symmetric at intervals of 90 degrees. It is needless to say that the exhaust ports 40 do not necessarily have to be rotationally symmetric. For example, at the tip end of the core mold 32 (more specifically, the core pin 34), a plurality of exhaust ports 40 may be disposed at any positions within a predetermined distance range from its central axis.

Note that the number of the exhaust ports 40 provided in the core pin 34 may be any number other than four (an integer of two, three, or more), as long as the arrangement is rotationally symmetric with respect to the central axis of the core mold 32. In addition, one exhaust port 40 may be provided at the position of the central axis of the core pin 34 (the center of the core pin).

The main body portion 35 is a member coupled with a drive mechanism (not illustrated) for driving the core mold 32 to move forward and backward, and the core pin 34 is coupled with a tip end side of the main body portion 35. A cylindrical inner space corresponding to the inner diameter of the core pin 34 is formed inside the main body portion 35 along the axial direction. The inner space of the main body portion 35 is connected with each of the introduction path 35a and a discharge path 35b for the temperature adjustment medium. In addition, in a state in which the core pin 34 is attached to the main body portion 35, the inner spaces of the main body portion 35 and the core pin 34 are coaxially connected with each other, and form one liquid-tight (watertight) cylindrical space in the core mold 32.

The cooling pipe 36 is a cylindrical member to be inserted into the inner space of the core mold 32.

The outer circumference of the cooling pipe 36 partitions the inner space of the core mold 32 into two spaces along the axial direction to form a flow path 43 for the temperature adjustment medium.

Figure 3:
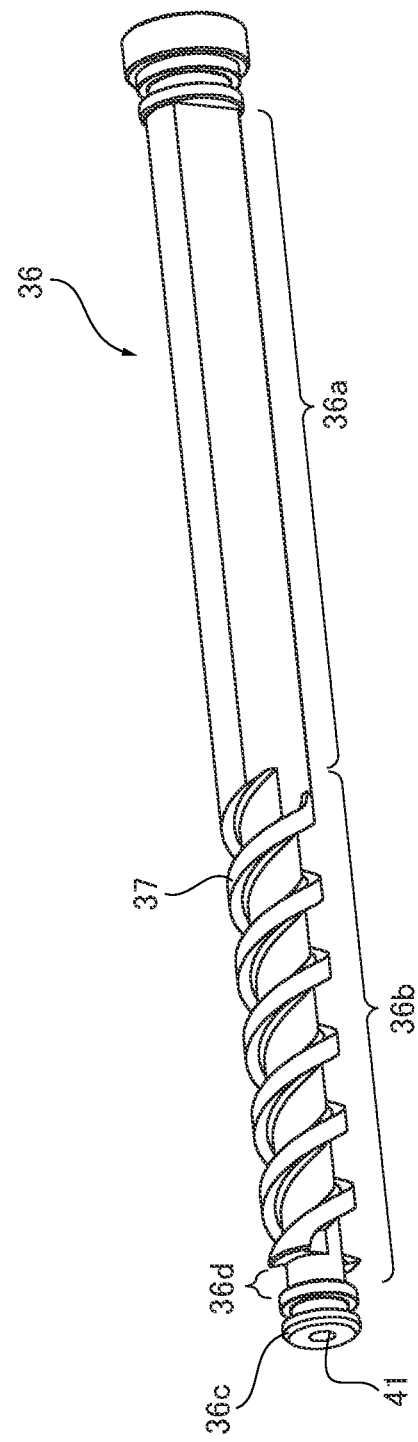
FIG. 3 is a perspective view illustrating a configuration example of a cooling pipe.

As illustrated in FIG. 3, on the outer circumference of the cooling pipe 36, a first region 36a corresponding to the main body portion 35 and a second region 36b corresponding to the core pin 34 are each formed in the axial direction.

Figure 4B:
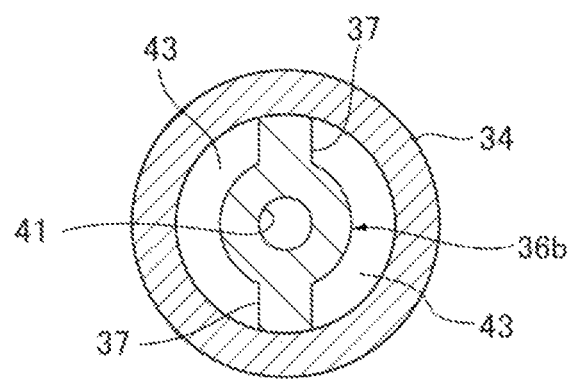
FIG. 4B is a cross-sectional view of a core pin of the core mold.
Figure 4C:
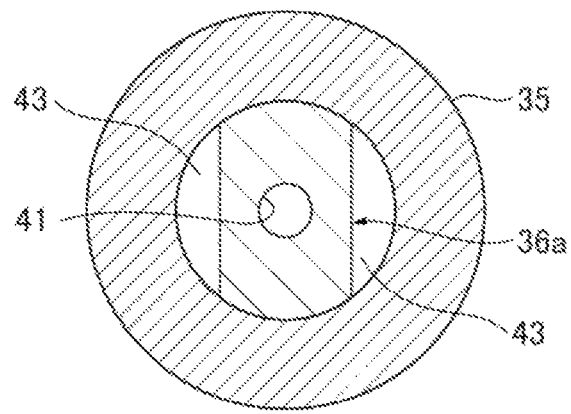
FIG. 4C is a cross-sectional view of a main body portion of the core mold.

As illustrated in FIGS. 3 and 4C, the first region 36a of the cooling pipe 36 has a cross-section having an oval shape in which a circle having an outer diameter corresponding to the inner space is cut out on both left and right sides. In addition, in the second region 36b of the cooling pipe 36, as illustrated in FIGS. 3 and 4B, a partition wall 37 having a spiral shape and forming a double-thread screw is formed on the outer circumference of the pipe. The outer diameter of the partition wall 37 is set to have a dimension corresponding to the inner diameter of the inner space.

Further, as illustrated in FIGS. 2 and 3, a circular sealing portion 36c into which an O-ring 38 is fitted is provided on the outer circumference of the tip end of the cooling pipe 36. The sealing portion 36c has a function of partitioning, in the axial direction, an exhaust chamber 42 formed on the tip end side of the core pin 34 and the flow path 43 for the temperature adjustment medium formed on the outer circumference of the cooling pipe 36. Further, as illustrated in FIG. 3, in the axial direction of the cooling pipe 36, a region 36d where the partition wall 37 is not formed is provided in the vicinity of the sealing portion 36c.

Furthermore, an exhaust path 41 extending in the axial direction from one end to the other end of the cooling pipe is formed inside the cooling pipe. The exhaust path 41 has a function of discharging the air that has flowed into the core pin 34 from the exhaust port 40 of the core pin 34 to the outside of the core mold 32.

In an assembled state in which the cooling pipe 36 is inserted into the core mold 32, an exhaust chamber 42 connected with the above exhaust port 40 and the exhaust path 41 is formed between the bottom surface side of the inner space of the core pin 34 and the tip end of the cooling pipe 36. Accordingly, when the core mold 32 is inserted into the preform 11, the air in the preform 11 is guided from the exhaust port 40 of the core pin 34 through the exhaust chamber 42 to the exhaust path 41, and is then exhausted to the outside. Note that the exhaust chamber 42 is sealed to the flow path 43 for the temperature adjustment medium by the O-ring 38.

In addition, in the assembled state in which the cooling pipe 36 is inserted into the core mold 32, the flow path 43 for the temperature adjustment medium is formed along the axial direction by the inner space of the core mold 32 and the cooling pipe 36. The flow path 43 for the temperature adjustment medium includes a first flow path 43a connected with the introduction path 35a for the temperature adjustment medium, and a second flow path 43b connected with the discharge path 35b for the temperature adjustment medium.

In the first region 36a of the cooling pipe 36, the first flow path 43a is formed on the right side in FIG. 2 with respect to the cooling pipe 36, and the second flow path 43b is formed on the left side in FIG. 2 with respect to the cooling pipe 36.

In the second region 36b of the cooling pipe 36, the first flow path 43a and the second flow path 43b are alternately arranged along the axial direction by the spiral-shaped partition wall 37 forming a double-thread screw. The first flow path 43a and the second flow path 43b in the second region 36b are formed to be spirally wound around the outer circumference of the cooling pipe 36.

In addition, the first flow path 43a and the second flow path 43b are connected with each other in the region 36d in the vicinity of the sealing portion 36c, and the flow of the temperature adjustment medium is configured to turn back at the tip end of the core mold 32. In the present embodiment, both the first flow path 43a and the second flow path 43b are formed on the outer circumference of the cooling pipe 36, and thus it is possible to facilitate processing of the flow path 43 in the cooling pipe 36.

In the core mold 32, the temperature adjustment medium flows from the introduction path 35a of the main body portion 35 through the first flow path 43a toward the tip end side of the core mold 32, and the temperature adjustment medium flows from the tip end side of the core mold 32 through the second flow path 43b toward the discharge path 35b of the main body portion 35. Such a flow of the temperature adjustment medium maintains the core mold 32 at a predetermined temperature. Note that the above flow of the temperature adjustment medium is an example, and the flow of the temperature adjustment medium may be reversed to make the temperature adjustment medium flow from the second flow path 43b side.

Note that the temperature of the temperature adjustment medium in the core mold 32 is not particularly limited, but can be appropriately selected within a range of, for example, 5° C. to 80° C., preferably 30° C. to 60° C.

(Blow Molding Unit 23)

Returning to FIG. 1, the blow molding unit 23 performs blow molding on the preform 11, the temperature of which has been adjusted by the temperature adjusting unit 22, to manufacture a container.

The blow molding unit 23 includes blow cavity molds that are a pair of split molds corresponding to the shape of the container, and an air introduction member including at least a stretching rod and a blow core mold (neither of them is illustrated). The blow molding unit 23 manufactures a container by performing stretch blow molding on the preform 11.

(Taking-Out Unit 24)

The taking-out unit 24 is configured to release the neck portion 12 of the container that has been manufactured by the blow molding unit 23 from the neck mold 27, and to take out the container to the outside of the blow molding apparatus 20.

(Description of Blow Molding Method)

Next, a blow molding method by the blow molding apparatus 20 in the present embodiment will be described.

Figure 6:
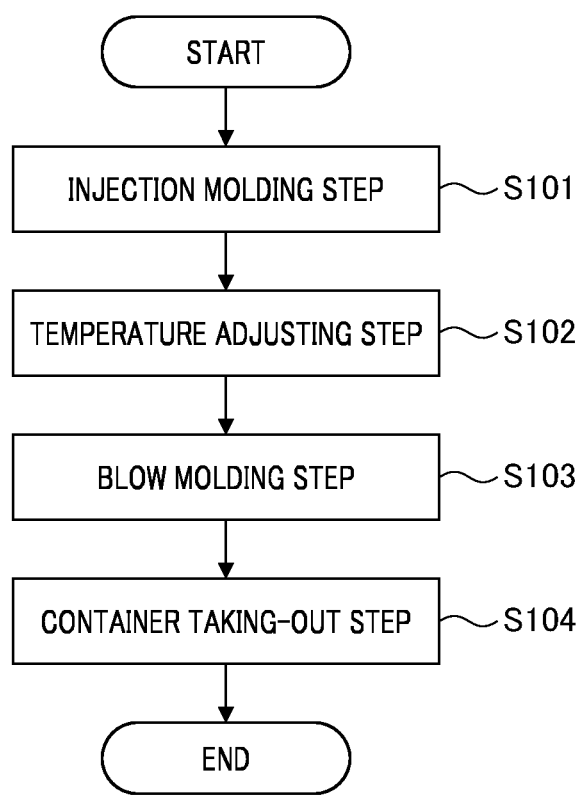
FIG. 6 is a flowchart illustrating steps of a blow molding method.

FIG. 6 is a flowchart illustrating steps of the blow molding method.

(Step S101: Injection Molding Step)

First, in the injection molding unit 21, a resin is injected from the injection device 25 into a preform-shaped mold space formed by the injection cavity mold, the injection core mold, and the neck mold 27 of the conveyance mechanism 26, and the preform 11 is manufactured.

In step S101, the injection molding unit 21 is opened immediately after the end of resin filling or after the minimum cooling time provided after resin filling. That is, the preform 11 in a high temperature state in which the outer shape of the preform 11 can be maintained is released from the injection cavity mold and the injection core mold. Then, the rotating plate of the conveyance mechanism 26 rotates by a predetermined angle, and the preform 11 held by the neck mold 27 is conveyed to the temperature adjusting unit 22.

Figure 7:
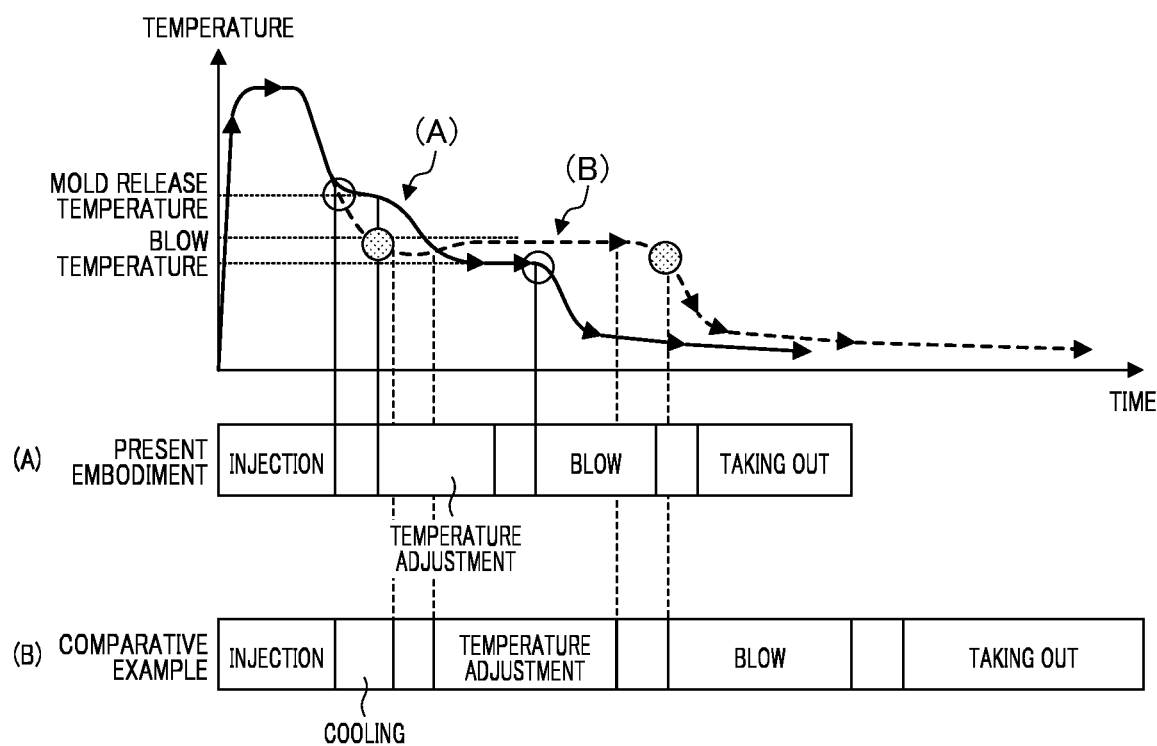
FIG. 7 is a graph illustrating an example of temperature changes of a preform in the blow molding method in the present embodiment and a comparative example.

Here, a temperature change of the preform 11 in the blow molding method in the present embodiment will be described with reference to FIG. 7. The vertical axis of FIG. 7 represents the temperature of the preform 11, and the horizontal axis of FIG. 7 represents time. In FIG. 7, an example of temperature change of a preform in the present embodiment is indicated by (A) in FIG. 7. In addition, an example of temperature change of a preform in a comparative example (conventional method) to be described later is indicated by (B) of FIG. 7. Note that blanks between the respective steps mean the time required to convey the preform 11 or the container 10, and are identical to one another.

In the present embodiment, when a resin material is injection-molded at a temperature equal to or higher than the melting point of the resin material, the injection molding unit 21 performs only minimum cooling of the preform 11 that has been subjected to the injection molding, and the temperature adjusting unit 22 cools and adjusts the temperature of the preform 11. In the present embodiment, after the injection molding unit 21 completes the injection of the resin material, the time (cooling time) for cooling the resin material is preferably ½ or less the time (injection time) for injecting the resin material. In addition, the time for cooling the resin material can be made shorter than the time for injecting the resin material in accordance with the weight of the resin material. The time for cooling the resin material is more preferably ⅖ or less, still more preferably ¼ or less, and particularly preferably ⅕ or less the time for injecting the resin material. The cooling time is significantly shortened as compared with the comparative example. Thus, a skin layer (surface layer in a solidified state) of the preform is formed thinner than a conventional one, and a core layer (inner layer in a softened or molten state) is formed thicker than the conventional one. That is, as compared with the comparative example, a preform having a large thermal gradient between the skin layer and the core layer and having high residual heat at a high temperature is formed.

In the present embodiment, the preform 11 that has been injection-molded is released from the injection molding unit 21 at a higher release temperature than that of the comparative example, and is conveyed to the temperature adjusting unit 22. With the movement to the temperature adjusting unit 22, the temperature of the preform 11 is equalized by heat exchange (heat conduction) between the skin layer and the core layer. Further, the preform 11 is slightly cooled from the outer surface by contact with the outside air. However, the temperature of the preform 11 is maintained at a substantially high release temperature, until the preform 11 is conveyed to the temperature adjusting unit 22. In the temperature adjusting unit 22, the temperature of the preform 11 decreases from the high release temperature to a blow temperature, and then the temperature of the preform 11 is maintained at the blow temperature until blow molding is performed.

Note that the blow temperature is a temperature suitable for the blow molding, and is set to 90° C. to 105° C. for a PET resin, for example. However, a lower blow temperature makes the stretching orientation of the preform 11 better, and is capable of enhancing the strength (physical property) of the container. For this reason, the blow temperature is preferably set to 90° C. to 95° C. for a PET resin, for example.

Here, due to the structure of the blow molding apparatus 20, the injection molding step, the temperature adjusting step, the blow molding step, and the container taking-out step respectively have the same lengths of time. Similarly, the conveyance times between the respective steps are the same.

On the other hand, as the comparative example, a description will be given with regard to an example of temperature change of the preform (FIG. 7B) in a case where the preform 11 is cooled in the injection molding step.

In the comparative example, the preform 11 is cooled to a temperature lower than or substantially the same as the blow temperature in the mold of the injection molding unit 21. As a result, in the comparative example, the time of the injection molding step is longer than that in the present embodiment. In such a case, the times of the respective steps are set in accordance with the time of the longest injection molding step. Hence, the time of the molding cycle of the container becomes long as a result.

(Step S102: Temperature Adjusting Step)

Subsequently, the temperature adjusting unit 22 makes a temperature adjustment for bringing the temperature of the preform 11 close to a temperature suitable for a final blow.

As illustrated in FIG. 2, in the temperature adjusting step, first, the preform 11 is accommodated in the preform-shaped space for temperature adjustment of the cavity mold 31. Subsequently, the core mold 32 is inserted into the preform 11 accommodated in the cavity mold 31.

Note that the cavity mold 31 and the core mold correspond to the shape of the preform 11, and thus the shape of the preform is maintained in a desired shape also in the temperature adjusting step.

In the temperature adjusting step, the preform 11 is brought into contact with the cavity mold and the core mold, so that the temperature of the preform 11 is adjusted so as not to be equal to or lower than a temperature suitable for blow molding, and the unevenness in temperature generated from the injection molding is also reduced.

In particular, in the second region 36b of the cooling pipe 36, the first flow path 43a and the second flow path 43b are formed into a spiral shape. Accordingly, the temperature adjustment medium in the core mold 32 flows in the circumferential direction, thus heat conduction in the circumferential direction in the core mold 32 is promoted, and it is possible to significantly reduce uneven temperature in the circumferential direction of the preform 11 in contact with the core mold 32.

Figure 5A:
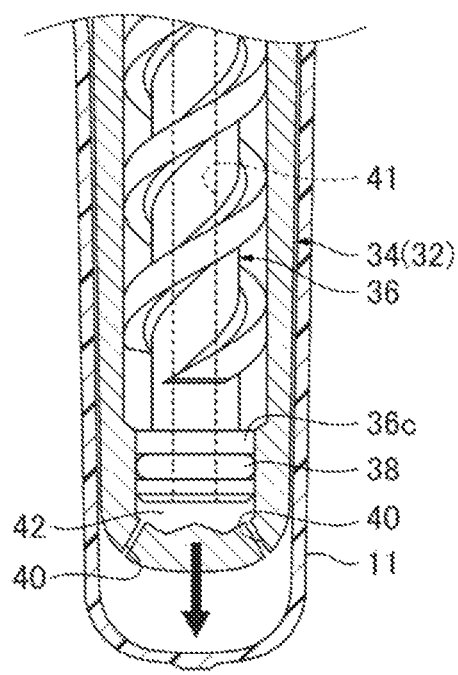
FIG. 5 is a diagram illustrating a flow of air when the core mold is inserted into a preform.
Figure 5B:
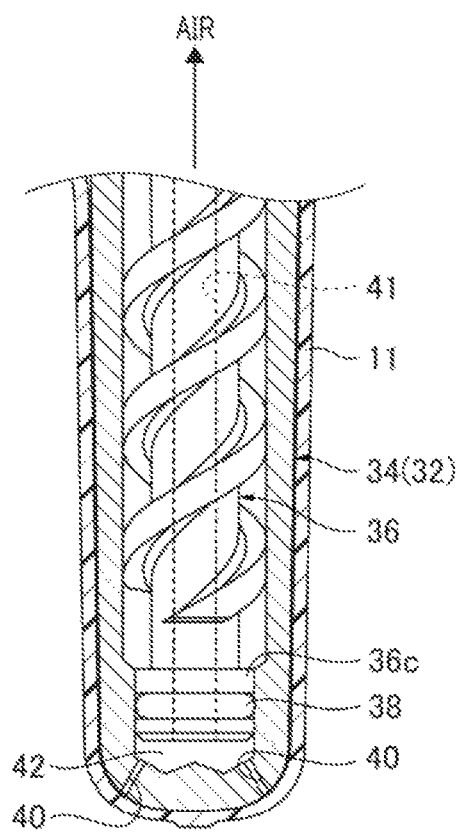

In addition, as illustrated in FIG. 5, when the core mold 32 is inserted into the preform 11, the air in the preform 11 is guided from the exhaust port 40 through the exhaust chamber 42 in the core pin to the exhaust path 41, and is then exhausted to the outside. Therefore, when the core mold 32 is inserted into the preform 11, for example, it is possible to suppress generation of air accumulation between the preform 11 and the core mold 32 on the bottom surface or the side surface of the preform. Accordingly, the contact area between the inner circumferential surface of the preform 11 and the core mold 32 is further increased, and thus it is possible to further improve the efficiency of additional cooling and uneven temperature adjustment of the preform 11, by using the core mold 32.

Note that the exhaust path 41 of the core mold 32 is disposed on the inner circumferential side of the flow path 43 for the temperature adjustment medium. That is, the exhaust path 41 is not located between the preform 11 and the flow path 43 for the temperature adjustment medium. Therefore, heat conduction between the preform 11 in contact with the core mold 32 and the temperature adjustment medium flowing through the core mold 32 is not hindered by being insulated by the exhaust path 41.

After the temperature adjusting step, the rotating plate of the conveyance mechanism 26 rotates by a predetermined angle, and the preform 11 that has been subjected to the temperature adjustment and that is held in the neck mold 27 is conveyed to the blow molding unit 23.

(Step S103: Blow Molding Step)

Subsequently, the container is blow-molded in the blow molding unit 23.

First, the blow molding mold is closed to accommodate the preform 11 in the mold space, and an air introduction member is inserted into the neck portion 12 of the preform 11. Then, blow air is introduced into the preform 11 from the air introduction member, while the air introduction member including the stretching rod being lowered. Accordingly, the preform 11 is bulged and shaped to be in close contact with the mold space of the blow molding mold, and is blow-molded into a container.

(Step S104: Container Taking-Out Step)

When the blow molding ends, the blow molding mold is opened. Accordingly, the container becomes movable from the blow molding unit 23.

Subsequently, the rotating plate of the conveyance mechanism 26 rotates by a predetermined angle, and the container is conveyed to the taking-out unit 24. In the taking-out unit 24, the neck portion 12 of the container is released from the neck mold 27, and the container is taken out to the outside of the blow molding apparatus 20.

Heretofore, a series of steps in the blow molding method ends. Then, the rotating plate of the conveyance mechanism 26 is rotated by a predetermined angle, so that the respective steps of S101 to S104 described above are repeated.

Hereinafter, advantages of the blow molding apparatus and the blow molding method in the present embodiment will be described.

In a case where a hot parison type preform is molded with a crystalline thermoplastic resin (a resin that can be in a transparent amorphous state or a cloudy crystalline state) used as a material, whitening (cloudiness) may occur due to insufficient cooling depending on the material. For example, in a case where a PET resin is used as a material, when the preform is slowly cooled (for example, cooled at room temperature for ten and a few seconds) in a temperature zone (120° C. to 200° C.) in which crystallization is promoted, crystallization due to spherulite formation occurs, and the preform tends to be whitened.

For this reason, conventionally, the injection molding mold of the preform is rapidly cooled (for example, at 10° C. for five seconds) to shorten the passage time in the above crystallization temperature zone, and the preform is sufficiently cooled in the injection molding step to suppress whitening of the preform.

On the other hand, according to the blow molding method in the present embodiment, the step of cooling the preform 11 is almost eliminated in the injection molding step (S101), and the preform 11 is cooled in the temperature adjusting step (S102). In the temperature adjusting step (S102), by bringing the preform 11 into close contact with the cavity mold 31 and the core mold 32, the preform 11 can be cooled simultaneously with the temperature adjustment of the preform 11. In the present embodiment, the temperature adjustment and cooling of the preform 11 can be performed in the temperature adjusting step (S102). Thus, it is possible to release the preform 11 even in a high temperature state in the injection molding step (S101), and to start molding the next preform 11 early. That is, according to the present embodiment, the container can be favorably molded, while the molding cycle time is shortened as compared with the molding cycle time in the comparative example.

In addition, in the present embodiment, the exhaust port 40, for discharging the air from the inside of the preform 11 through the exhaust path 41 in the core mold 32, is provided at the tip end portion of the core mold 32. Accordingly, when the core mold 32 is inserted into the preform 11, the air in the preform 11 can be discharged to the outside. The region where the contact between the core mold 32 and the preform 11 is prevented by the air is no longer present, and the contact area between the inner circumferential surface of the preform 11 and the core mold 32 is increased, and thus it is possible to further improve the efficiency of additional cooling and uneven temperature adjustment of the preform 11 in a high temperature state, by using the core mold 32. The above advantages are the same regardless of the shape of the preform 11. For example, even with the preform 11 having an elongated shape that is difficult to exhaust the air, it is possible to improve the efficiency of additional cooling and uneven temperature adjustment.

In particular, the molding cycle time is shortened, and so the time for the temperature adjusting process is also shortened, and it is necessary to further improve the efficiency of heat exchange between the core mold 32 and the preform 11. According to the present embodiment, the formations of the exhaust port 40 and the exhaust path 41 further improve the efficiency of the additional cooling and the uneven temperature adjustment of the preform 11 in a high temperature state, by using the core mold 32. Therefore, the temperature adjustment is enabled in a short time in the temperature adjusting step (S102). That is, shortening of the molding cycle is achieved without quality degradation of the container to be manufactured.

Second Embodiment

A second embodiment is a modification of the first embodiment.

In the following description of the second embodiment, the same elements as those of the first embodiment are denoted by the same reference numerals, and overlapping descriptions will be omitted. The blow molding apparatus 20 in the second embodiment is different in the configuration of the mold unit 30 of the temperature adjusting unit 22.

Figure 8:
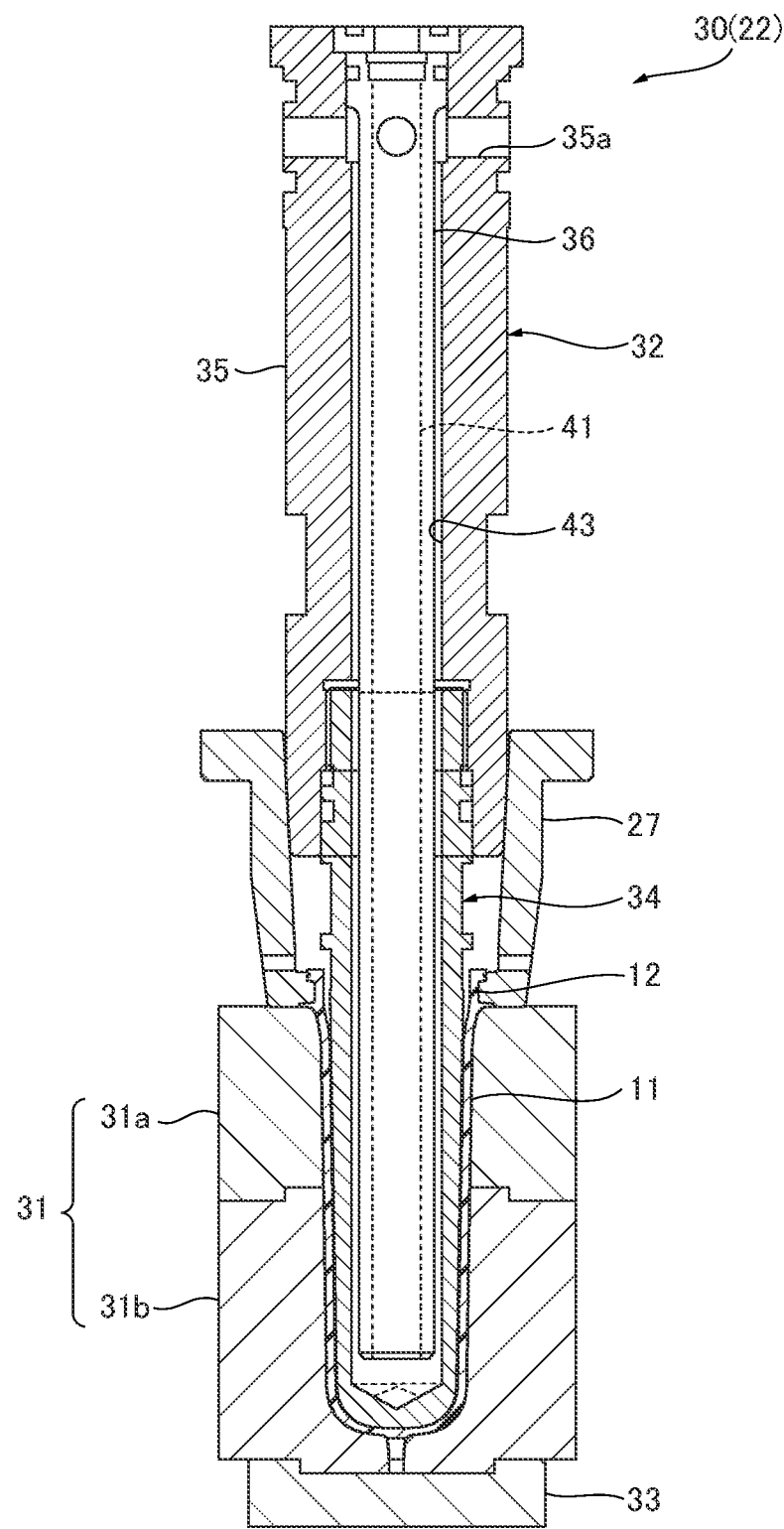
FIG. 8 is a diagram illustrating a configuration example of a temperature adjusting unit in a second embodiment.

FIG. 8 is a diagram illustrating a configuration example of a temperature adjusting unit in the second embodiment. As illustrated in FIG. 8, the temperature adjusting unit 22 includes a mold unit 30 for temperature adjustment. The mold unit 30 is an example of a cooling mold unit, and includes a cavity mold (temperature adjusting pot) 31 capable of accommodating the preform 11, and a core mold 32. The configuration of the cavity mold 31 is the same as that in the first embodiment.

The core mold 32 is a mold to be inserted into the preform 11, and is disposed to be movable forward and backward with respect to the neck mold 27 that holds the preform 11 by the temperature adjusting unit 22. FIG. 8 illustrates a state in which the core mold 32 extends downward in the drawing and is inserted into the neck mold 27.

The core mold 32 includes a core pin 34, a main body portion 35, and a cooling pipe 36.

The core pin 34 is a bottomed cylindrical, bar-shaped member to be inserted into the preform 11, and has an outer shape substantially the same as the inner shape of the preform 11. In addition, a cylindrical inner space for the temperature adjustment medium to flow through is formed inside the core pin 34 along the axial direction.

The main body portion 35 is a member coupled with a drive mechanism (not illustrated) for driving the core mold 32 to move forward and backward, and the core pin 34 is coupled with a tip end side of the main body portion 35. A cylindrical inner space corresponding to the inner diameter of the core pin 34 is formed inside the main body portion 35 along the axial direction. The inner space of the main body portion 35 is connected with an introduction path 35a for the temperature adjustment medium. In addition, in a state in which the core pin 34 is attached to the main body portion 35, the inner spaces of the main body portion 35 and the core pin 34 are coaxially connected with each other, and form one liquid-tight (water-tight) cylindrical space in the core mold 32.

The cooling pipe 36 is a cylindrical member to be inserted into the inner space of the core mold 32, and has a function of partitioning the flow of the temperature adjustment medium flowed from the introduction path 35a.

The outer diameter of the cooling pipe 36 is smaller than the inner space of the core mold 32, and the axial length of the cooling pipe 36 is set to be substantially the same in dimension as the axial length of the inner space of the core mold 32.

The inner space of the core mold 32, in a state in which the cooling pipe is inserted, is partitioned along the axial direction into a first flow path 43 on the outer circumferential side of the cooling pipe 36 and a second flow path 41 on the inner circumferential side of the cooling pipe 36. The first flow path 43 and the second flow path 41 communicate with each other at the tip end side of the cooling pipe 36 facing the inner bottom of the core pin 34. The first flow path 43 is connected with the introduction path 35a for the temperature adjustment medium in the main body portion 35, and the second flow path 41 is connected with a discharge path, not illustrated, for the temperature adjustment medium.

Accordingly, in the inside of the core mold 32, the temperature adjustment medium flows from the introduction path 35a of the main body portion 35 through the first flow path 43 toward the tip end side of the core mold 32, and the temperature adjustment medium turns back from the tip end side of the core mold 32 and flows through the second flow path 41 in the cooling pipe 36. Such a flow of the temperature adjustment medium maintains the core mold 32 at a predetermined temperature. Note that the above flow of the temperature adjustment medium is an example, and the flow of the temperature adjustment medium may be reversed to make the temperature adjustment medium flow from the second flow path 41 side.

In addition, an exhaust groove 34a, extending from the tip end side of the core pin 34 to be inserted into the preform 11 to a base end portion not to be inserted into the preform 11, is provided on the outer surface of the core pin 34. The exhaust groove 34a has a function of discharging the air in the preform 11 to the outside of the preform 11, when the core mold 32 is inserted into the preform 11, and improving the contact property between the core mold 32 and the preform 11.

Figure 9A:
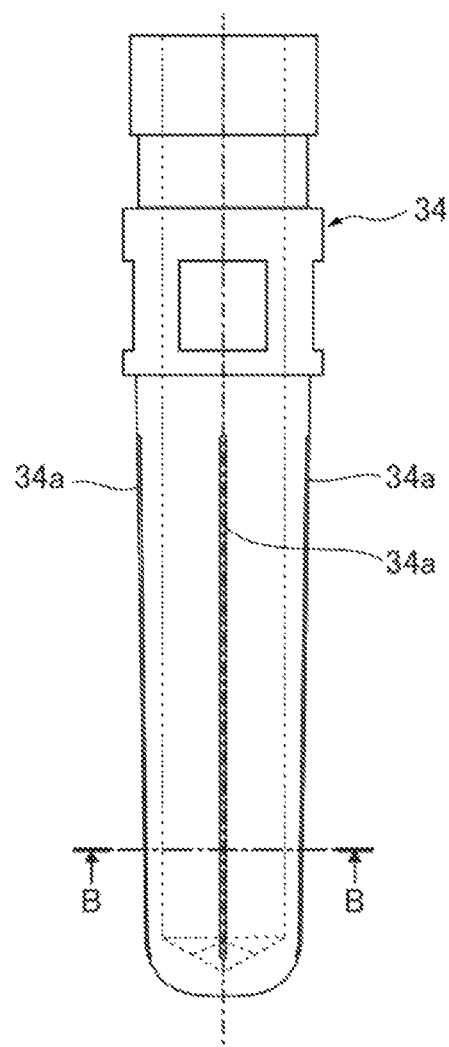
FIG. 9 is a view illustrating an example of forming an exhaust groove in the core mold in the second embodiment.
Figure 9B:
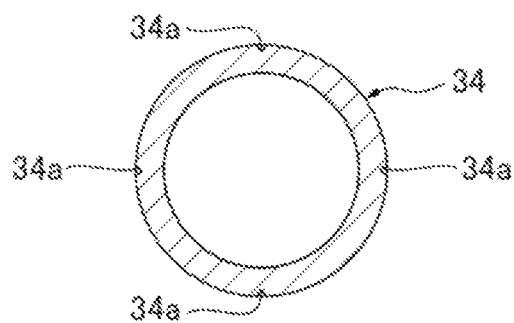

FIG. 9 is a view illustrating an example of forming the exhaust groove 34a in the present embodiment. As illustrated in FIG. 9A, a plurality of linear exhaust grooves 34a along the axial direction of the core pin 34 are formed in the core pin 34 in the present embodiment. As illustrated in FIG. 9B, for example, four exhaust grooves 34a are formed at equal intervals of every 90 degrees in the circumferential direction of the core pin. The number and arrangement interval of the exhaust grooves 34a can be appropriately changed.

Note that the cross-sectional shape of the exhaust groove 34a is not particularly limited as long as the air between the preform 11 and the core pin 34 can be discharged, and may be any shape such as a V shape, a rectangular shape, or a semicircular shape.

The number of the exhaust grooves 34a of the core pin 34 may be one. However, in a case where a plurality of the exhaust grooves 34a are formed in the core pin 34, the air can be discharged from a plurality of places when the core mold 32 is inserted into the preform 11. Thus, uneven contact between the core mold 32 and the preform 11 is less likely to occur. In particular, it is more preferable to form a plurality of exhaust grooves 34a at rotationally symmetric positions in the circumferential direction of the core pin 34, because the air in the preform 11 can be easily discharged uniformly in the circumferential direction.

The dimension of the groove width of each exhaust groove 34a is not particularly limited, but is set to, for example, 0.02 mm or more and 0.2 mm or less.

As the groove width of the exhaust groove 34a increases, the mark of the exhaust groove 34a becomes conspicuous in the container that has been shaped from the preform 11. For this reason, from the viewpoint of forming a favorable container in which the mark of the exhaust groove 34a is less conspicuous, the groove width of the exhaust groove 34a is preferably 0.2 mm or less.

On the other hand, as the groove width of the exhaust groove 34a decreases, the processing cost of the exhaust groove 34a increases, although it becomes difficult to discharge the air. Accordingly, from the viewpoint of keeping the processing cost within a practical range while keeping the function of the exhaust groove 34a, the groove width of the exhaust groove 34a is preferably 0.02 mm or more.

In addition, the dimension of the groove depth of each exhaust groove 34a is not particularly limited, but is set to, for example, 0.02 mm or more and 3 mm or less.

From the viewpoint of ensuring the function of discharging the air through the exhaust groove 34a, the groove depth of the exhaust groove 34a is preferably 0.02 mm or more.

On the other hand, as the groove depth of the exhaust groove 34a increases, the air is easily discharged. However, it is necessary to make the core pin 34 thick for such an increased amount to form the exhaust groove 34a, and the efficiency of cooling the preform 11 by using the core mold 32 is likely to decrease. For this reason, the groove depth of the exhaust groove 34a is preferably 3 mm or less so that the core pin 34 does not have to be thick more than necessary.

In addition, as a method for processing the exhaust groove 34a in the core pin 34, any method is adoptable from known processing techniques in accordance with the material of the core pin 34.

Figure 11A:
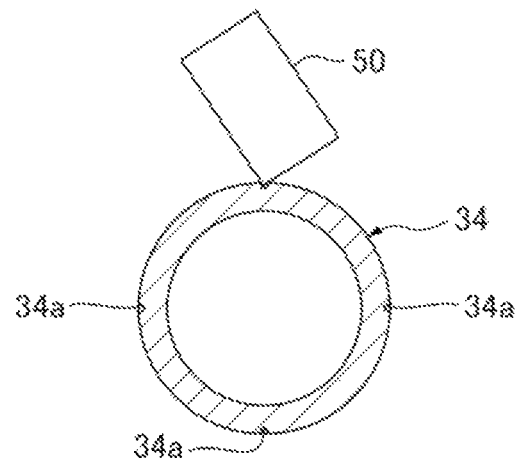
FIG. 11 is a diagram illustrating an example of a method for processing an exhaust groove in the second embodiment.

For example, as illustrated in FIG. 11A, the exhaust groove 34a may be formed in the core pin 34 by pressing one end of an end mill 50 having a pillar shape against the circumferential surface of the core pin 34 from an oblique direction in top view and relatively moving the end mill 50 in the axial direction with respect to the core pin 34. According to the processing method of FIG. 11A, the exhaust groove 34a can be easily formed at a relatively low cost.

Figure 11B:
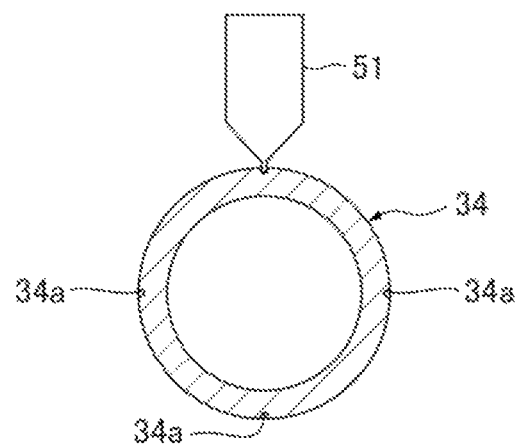

In addition, as illustrated in FIG. 11B, the exhaust groove 34a may be formed by preparing a rotary cutting tool 51 having a tapered shape corresponding to the shape of the exhaust groove 34a, vertically pressing the rotary cutting tool 51 against the circumferential surface of the core pin 34, and relatively moving the rotary cutting tool 51 in the axial direction with respect to the core pin 34.

Figure 11C:
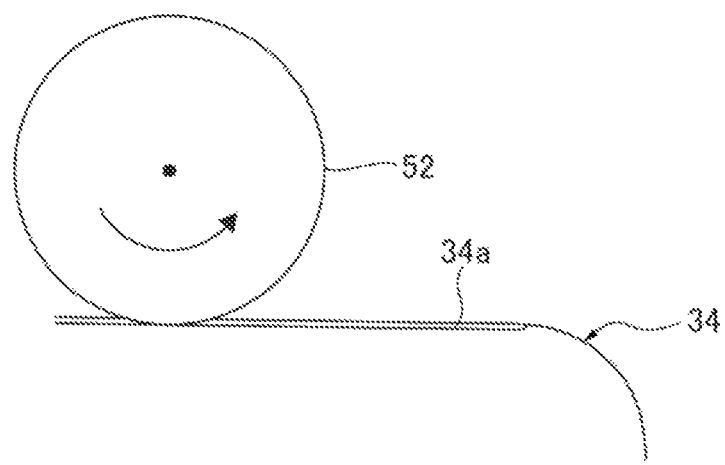

Further, as illustrated in FIG. 11C, the exhaust groove 34a may be formed by pressing a saw blade 52 that rotates along the axial direction of the core pin 34 against the circumferential surface of the core pin 34.

The steps in the blow molding method in the second embodiment are the same as those in the first embodiment except for the temperature adjusting step (S102 in FIG. 6).

Figure 10A:
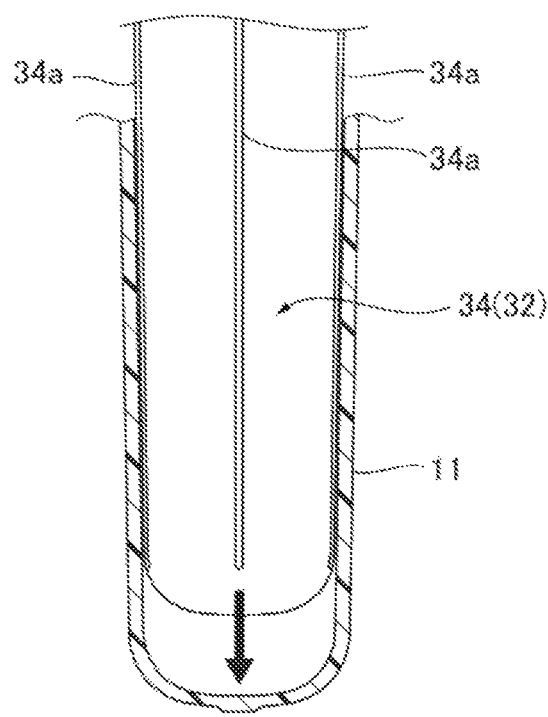
FIG. 10 is a view illustrating a flow of the air when the core mold is inserted into the preform in the second embodiment.
Figure 10B:
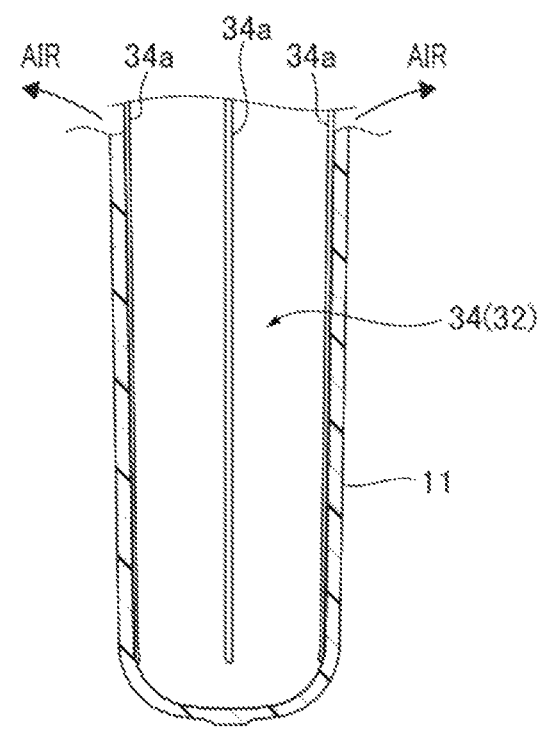

As illustrated in FIG. 10, when the core mold 32 is inserted into the preform 11 in the temperature adjusting step in the second embodiment, the air in the preform 11 is discharged to the outside of the preform 11 through the exhaust groove 34a of the core pin 34. Therefore, when the core mold 32 is inserted into the preform 11, for example, it is possible to suppress generation of air accumulation between the preform 11 and the core mold 32 on the bottom surface or the side surface of the preform. Accordingly, the contact area between the inner circumferential surface of the preform 11 and the core mold 32 is further increased, and thus it is possible to further improve the efficiency of additional cooling and uneven temperature adjustment of the preform 11, by using the core mold 32.

As described heretofore, in the second embodiment, by cooling the preform 11 in the temperature adjusting step (S102), it is possible to favorably mold the container while shortening the molding cycle time in the same manner as the first embodiment.

In addition, in the second embodiment, an exhaust groove 34a extending from the tip end side to the base end side of the core pin 34 is provided on the surface of the core mold 32 facing the inner surface of the preform 11. Accordingly, when the core mold 32 is inserted into the preform 11, the air in the preform 11 can be discharged from the exhaust groove 34a. The region where the contact between the core mold 32 and the preform 11 is prevented by the air is no longer present, and the contact area between the inner circumferential surface of the preform 11 and the core mold 32 is increased, and thus it is possible to further improve the efficiency of additional cooling and uneven temperature adjustment of the preform 11 in a high temperature state, by using the core mold 32. The above advantages are the same regardless of the shape of the preform 11. For example, even with the preform 11 having an elongated shape that is difficult to exhaust the air, it is possible to improve the efficiency of additional cooling and uneven temperature adjustment.

In particular, the molding cycle time is shortened, and so the time for the temperature adjusting process is also shortened, and it is necessary to further improve the efficiency of heat exchange between the core mold 32 and the preform 11. According to the second embodiment, the formation of the exhaust groove 34a further improves the efficiency of the additional cooling and the uneven temperature adjustment of the preform 11 in a high temperature state, by using the core mold 32. Thus, it is possible to adjust the temperature in a short time in the temperature adjusting step (S102). That is, shortening of the molding cycle is achieved without quality degradation of the container to be manufactured.

In general, the preform 11 in a high temperature state is easily deformed following the recess of the mold, and if the width of the exhaust groove 34a is increased, the mark of the exhaust groove 34a becomes conspicuous also on the container of a final molded article. However, in the present embodiment, the dimension of the groove width of the exhaust groove 34a is set to 0.02 mm or more and 0.2 mm or less. Therefore, it is possible to obtain a favorable container in which the mark of the exhaust groove 34a is not conspicuous.

Third Embodiment

Figure 12:
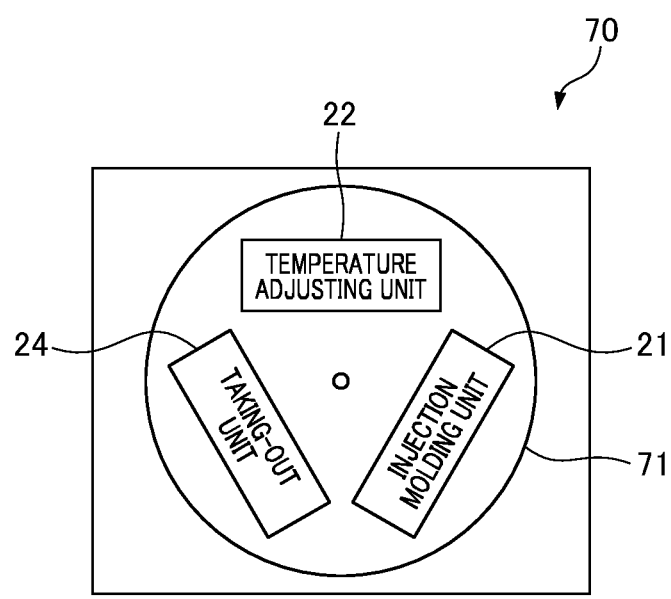
FIG. 12 is a diagram schematically illustrating a configuration of an injection molding apparatus in a third embodiment.

FIG. 12 is a diagram schematically illustrating a configuration of an injection molding apparatus 60 in a third embodiment. The injection molding apparatus 60 in the present embodiment is an apparatus used for manufacturing the preform 11 at a high speed, and corresponds to the blow molding apparatus 20 in the first embodiment or the second embodiment, from which the blow molding unit 23 is excluded. For this reason, in the third embodiment, the same reference numerals are given to the same configurations as those of the first embodiment or the second embodiment, and overlapping descriptions will be omitted.

The injection molding apparatus 60 includes an injection molding unit 21, a temperature adjusting unit (temperature adjusting unit for cooling the preform 11, a post-cooling unit) 22, a taking-out unit 24, and a rotating plate 61 as a conveyance mechanism. The injection molding apparatus 60 in the third embodiment includes a mold unit 30, which is the same as that in the first embodiment or the second embodiment, in the temperature adjusting unit 22.

The injection molding unit 21, the temperature adjusting unit 22, and the taking-out unit 24 are disposed at positions rotated by a predetermined angle (for example, 120 degrees) in the circumferential direction of the rotating plate 61. The configuration of the rotating plate 61 is the same as that of the conveyance mechanism in the first embodiment, except that the rotation angle is different for every step.

In the injection molding apparatus 60 in the third embodiment, the preform 11 with the neck portion 12 held by the neck mold 27 is conveyed to the injection molding unit 21, the temperature adjusting unit 22, and the taking-out unit 24 in this order by the rotation of the rotating plate 61.

In the injection molding apparatus 60 in the third embodiment, the temperature adjusting unit 22 including the mold unit 30 of FIG. 2 or FIG. 8 is provided on a downstream side of the injection molding unit 21, so that the temperature adjusting unit 22 can additionally cool the preform 11. The temperature adjusting unit 22 additionally cools the preform 11. Thus, in the injection molding unit 21, in the same manner as the first embodiment or the second embodiment ((A) of FIG. 7 in the present embodiment), the preform 11 can be released even in a high temperature state. Therefore, it is possible to significantly shorten the cooling time of the preform 11 in the injection molding unit 21. Accordingly, in the third embodiment, it is possible to start molding the next preform 11 early, and thus to shorten the molding cycle time of the preform 11.

Also in the third embodiment, advantages of the temperature adjusting unit 22 that have been described in the first embodiment or the second embodiment are obtainable in the same manner. Note that in the third embodiment, so that whitening (cloudiness), sink marks, or irregular deformation does not occur at room temperature after the taking-out unit 24 discharges the preform 11 to the outside of the apparatus, it is necessary for the temperature adjusting unit 22 to cool the preform until the preform 11 is completely solidified (it is necessary to cool the temperature of the preform 11 to a temperature equal to or lower than a temperature suitable for blow molding (for example, 50° C. or lower)). Therefore, the temperatures of the mold unit 30 and the cavity mold 31 are set to low temperatures by the temperature adjustment medium having a low temperature (for example, 0° C. to 20° C.)

The present invention is not limited to the above embodiments, and various improvements and design changes may be made without departing from the gist of the present invention.

For example, in the above first embodiment, the description has been given with regard to the example in which both the first flow path 43a and the second flow path 43b for the temperature adjustment medium in the core mold 32 are formed in an identical layer of the core mold 32. However, the inside of the core mold 32 may have a three-layered structure to dispose the first flow path 43a and the second flow path 43b in different layers in the radial direction.

In addition, for example, the exhaust groove 34a in the second embodiment is not limited to being formed linearly along the axial direction of the core pin 34, and may be formed in another pattern.

Figure 13A:
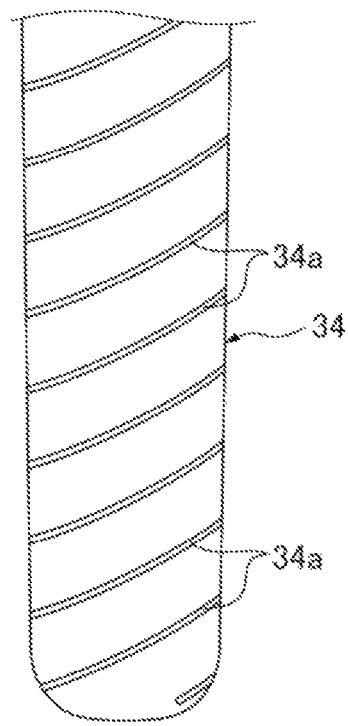
FIG. 13 is a view illustrating another example of forming the exhaust groove in the core mold.

FIG. 13A illustrates an example in which the exhaust groove 34a is formed in a spiral shape on the core pin 34. Also in the case where the exhaust groove 34a is formed in a spiral shape, a plurality of exhaust grooves 34a are preferably formed on the core pin 34 so that the respective exhaust grooves 34a are disposed at rotationally symmetric positions.

Figure 13B:
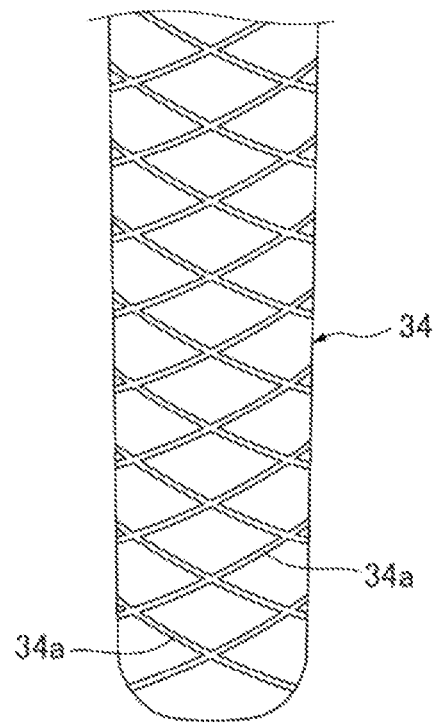

FIG. 13B illustrates an example in which a plurality of exhaust grooves 34a are formed on the core pin 34 so as to intersect one another. In the configuration of FIG. 13B, the exhaust grooves 34a intersect at a plurality of locations between the tip end side and the base end side of the core pin 34. Therefore, for example, even if partial clogging occurs in any of the exhaust grooves 34a, the air can pass through other intersecting exhaust grooves 34a, and the air in the preform 11 can be more reliably discharged, when the core mold 32 is inserted into the preform 11.

In addition, the embodiments disclosed herein are to be considered in all respects as illustrative and non-limiting ones. The scope of the present invention is indicated not by the above description but by the scope of claims, and it is intended that meanings equivalent to the claims and all modifications within the scope are included.

The invention claimed is:

1. A cooling mold unit for cooling a preform that has been injection-molded, the preform having a bottomed shape and made of a resin, the cooling mold unit comprising
   a core mold having an outer shape corresponding to an inner shape of the preform, and being insertable into the preform, wherein
   an exhaust groove extending from a tip end side to a base end side of an insertion part of the preform is provided on a surface facing an inner surface of the preform, in the core mold.

2. The cooling mold unit according to claim 1, wherein
   a plurality of the exhaust grooves are formed in a circumferential direction of the core mold.

3. The cooling mold unit according to claim 1, wherein
   a groove width of the exhaust groove is set to be equal to or more than 0.02 mm and equal to or less than 0.2 mm, and
   a groove depth of the exhaust groove is set to be equal to or more than 0.02 mm and equal to or less than 3 mm.

4. The cooling mold unit according to claim 1, further comprising
   a cavity mold configured to accommodate the preform.

5. A blow molding apparatus comprising:
   an injection molding unit configured to injection-mold a preform having a bottomed shape and made of a resin;
   a temperature adjusting unit including the cooling mold unit of claim 1, and configured to adjust a temperature of the preform that has been manufactured by the injection molding unit; and
   a blow molding unit configured to blow-mold the preform, the temperature of which has been adjusted, to manufacture a container made of the resin.

6. A blow molding method comprising:
   injection-molding a preform having a bottomed shape and made of a resin;
   adjusting a temperature of the preform that has been manufactured in the injection molding, using the cooling mold unit of claim 1; and
   blow-molding the preform, the temperature of which has been adjusted, to manufacture a container made of the resin.

7. An injection molding apparatus comprising:
   an injection molding unit configured to injection-mold a preform having a bottomed shape and made of a resin; and
   a temperature adjusting unit including the cooling mold unit of claim 1, and configured to adjust a temperature of the preform that has been manufactured by the injection molding unit.

8. An injection molding method comprising:
   injection-molding a preform having a bottomed shape and made of a resin; and
   adjusting a temperature of the preform that has been manufactured in the injection molding, using the cooling mold unit of claim 1.

* * * * *